(No Model.)  3 Sheets—Sheet 1.

J. McGEE.
CAR BRAKE.

No. 510,702. Patented Dec. 12, 1893.

Witnesses

Inventor
James McGee
by Requa and Redland
Attorneys.

(No Model.) 3 Sheets—Sheet 2.
J. McGEE.
CAR BRAKE.
No. 510,702. Patented Dec. 12, 1893.
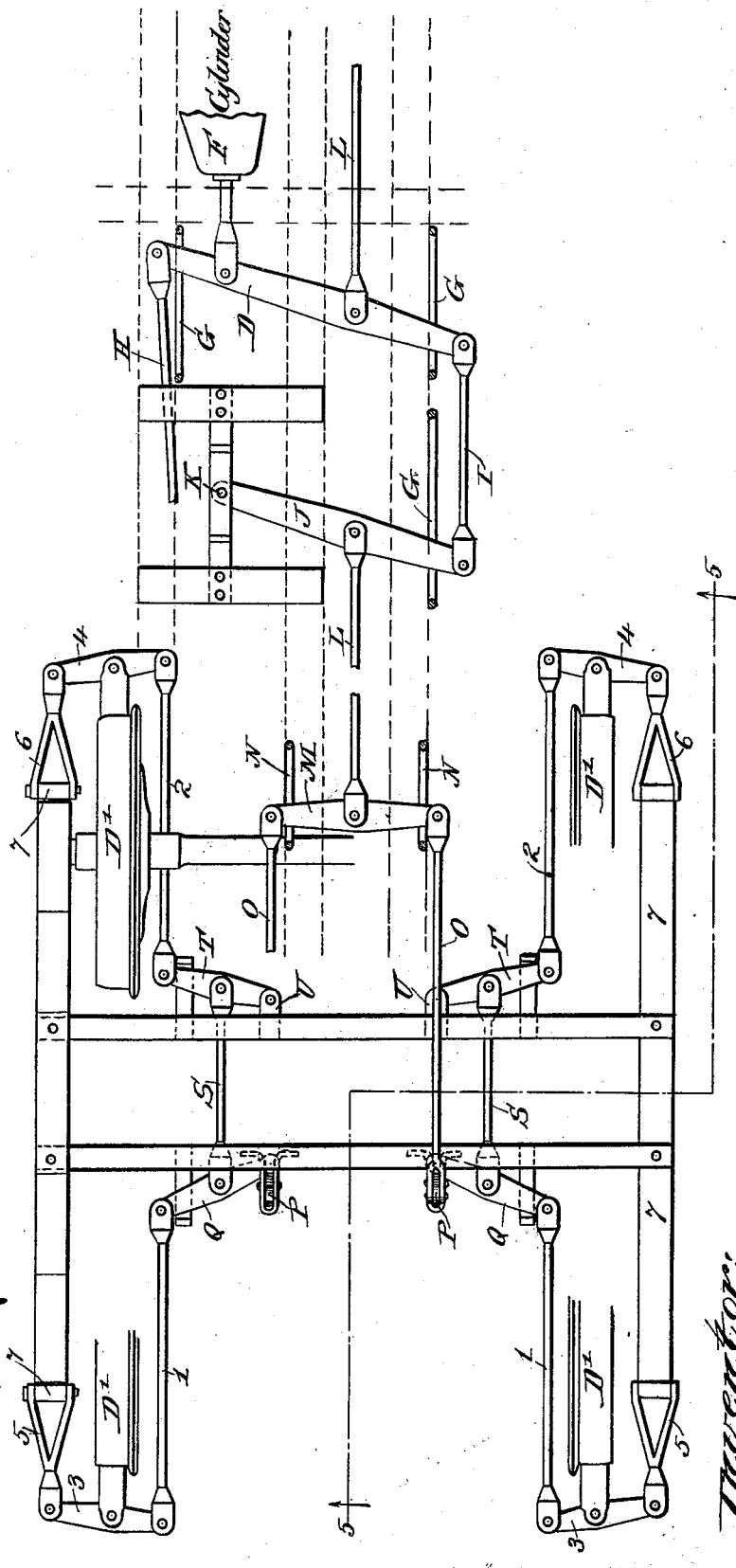

(No Model.) 3 Sheets—Sheet 3.
J. McGEE.
CAR BRAKE.
No. 510,702. Patented Dec. 12, 1893.
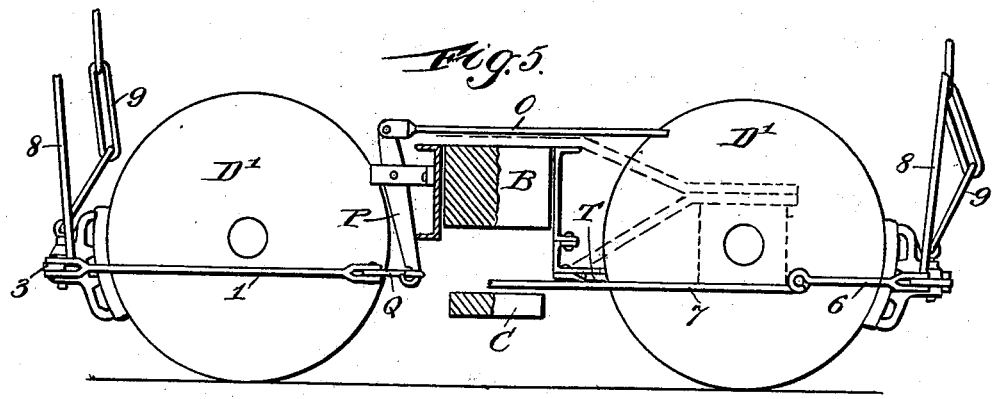
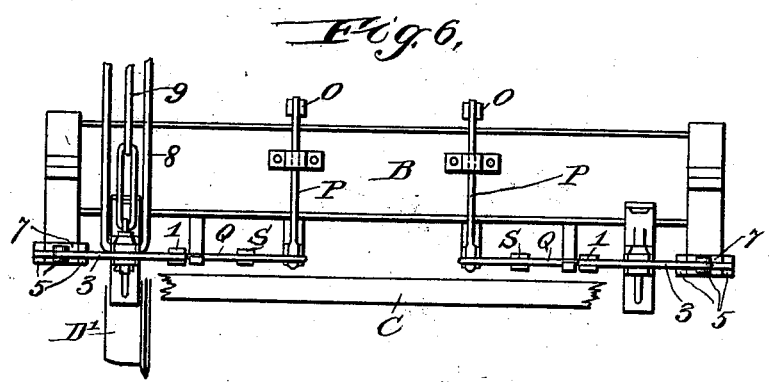

UNITED STATES PATENT OFFICE.

JAMES McGEE, OF HOUSTON, TEXAS.

CAR-BRAKE.

SPECIFICATION forming part of Letters Patent No. 510,702, dated December 12, 1893.

Application filed February 21, 1893. Serial No. 463,247. (No model.)

*To all whom it may concern:*

Be it known that I, JAMES MCGEE, a citizen of the United States, residing in Houston, in the county of Harris and State of Texas, have invented certain new and useful Improvements in Car-Brakes, of which the following is a specification, reference being had to the accompanying drawings.

This invention relates to that class of car brakes in which brake beams are dispensed with and independent brake shoes are employed, so connected with each other as to equalize the brake pressure upon the different wheels of the car truck.

Heretofore a centrally disposed floating lever has been employed to which the brake power is applied and from which such power is transmitted to the two groups of brake mechanism on the trucks of the car, to one of the brake shoe levers of each of which groups the floating lever is directly connected.

A primary object of this invention is to obtain in a car brake of this class a central transmission of the applied brake power to the different groups of brake mechanism whereby the brake power is distributed equally to each wheel and the brakes are not only rendered more stable and certain in their operation, but are better adapted for the application of either hand or air brake power or pressure.

Another primary object of this invention is to have the brake shoes pivotally suspended from the car body or truck and operated by an adjustable pivoted lever in such manner that the range of action of the shoe may be varied and the wear thereof compensated for, whereby greater longevity and more perfect action of the brake mechanism is secured.

Other primary objects of the invention are to have the brake operating mechanism of such character that the power may be applied in practically the same manner to either inside or outside hung brake shoes and yet be equally and uniformly distributed to all the wheels of the truck; and to provide certain details in the carrying out of my invention, all as typically illustrated in the accompanying drawings, in which—

Figure 3:
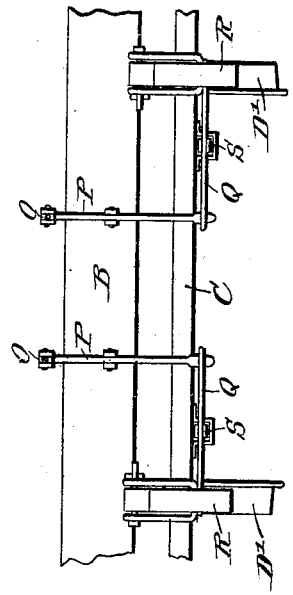
Figure 2:
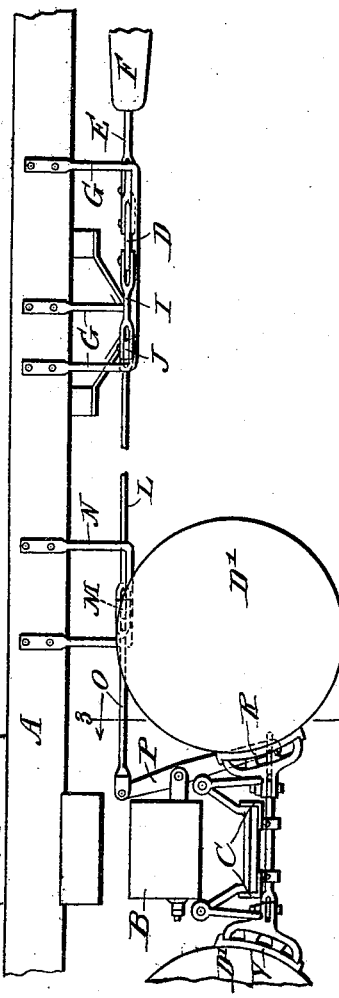
Figure 1:
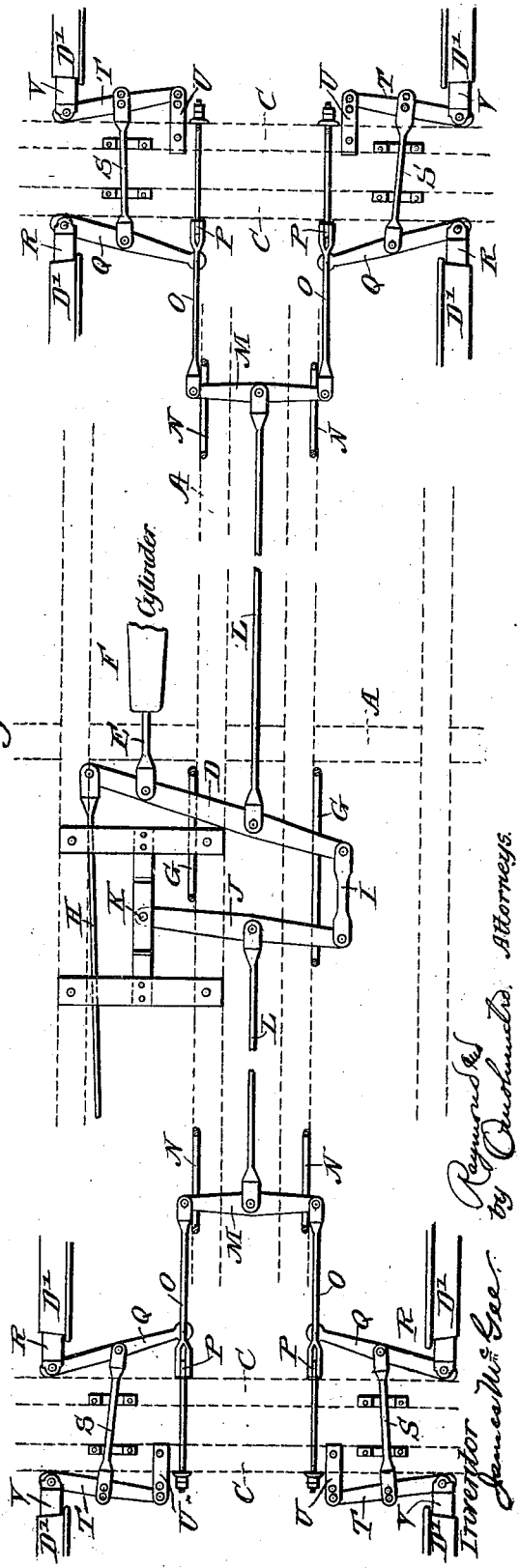

Figure 1 is a diagrammatic plan view of car brakes embodying my invention showing the application thereof to inside hung brake shoes; Fig. 2 a longitudinal sectional elevation of the same; Fig. 3 a detail transverse vertical section on the line 3—3 of Fig. 2 looking in the direction indicated by the arrows; Fig. 4 a view similar to Fig. 1 but illustrating the application of my invention to outside hung brake shoes; Fig. 5 a longitudinal section on the line 5—5 of Fig. 4 looking in the direction indicated by the arrows; and Fig. 6 an end elevation of the truck shown in Figs. 4 and 5.

Similar letters and numerals of reference indicate the same parts in the several figures of the drawings.

Referring by letter and figure to the accompanying drawings, A designates the car frame, B the truck bolsters, C the truck holding cross beams and D the car wheels, all of which may be of the usual or any desired construction and arrangement. About the center of length of the car body is located the transverse floating lever D which is connected near one end thereof by the rod E with the piston of the air brake cylinder F and which works through suitable stirrups G depending from the car frame. To the end of this floating lever D next its connection with the air brake cylinder is connected a rod H leading to the ordinary hand brake mechanism or staff at the end of the car, while the other end of the lever D is connected by a link I with a companion lever J extending transversely across the car normally approximately parallel with the floating lever and pivoted at its opposite end K to the car body.

Pivotally connected with the levers D and J at about the center of the length thereof and at the center of width of the car body, are the rods L extending in opposite directions and connected at their other ends respectively, to the equalizing levers M, each of which is in turn connected to one set of the brake shoe operating mechanism on the respective trucks of the car, and as such mechanism is duplicated on the different trucks, in describing it in detail I will refer to but one set of such mechanism, for greater clearness of description. Each equalizing lever M floats in suitable stirrups N depending from the car frame and has connected with its ends respectively rods O which are in turn connected with the upper ends of operating levers P pivoted near their centers of length to the truck bolsters B and at their lower ends having hook and eye connections, or equivalent universal joint connections, with horizontal floating levers Q carrying on their outer free ends the brake shoes R and near their centers of length being connected by rods S with fixed levers T adjustably pivoted both to the rods S and their fulcrums U, as clearly illustrated in Fig. 1, the said levers T carrying on their outer ends the brake shoes V which bear against the inner sides of the outer wheels of the truck, while the brake shoes R bear against the inner sides of the inner wheels of the truck and thus oppose the other brake shoes V on the same truck. It will thus be readily seen that whenever brake power is applied to the floating lever D either by the hand brake staffs, brakes or by the air brakes it will be transmitted centrally to the brake mechanism at each end of the car and equally distributed between the brake shoes and consequently to all of the wheels of each truck. The adjustable pivotal connections of the levers T both with their fulcrum-supports and their adjustable pivot-connections with their connecting-rods S, enable the braking-pressure to be uniformly and equally applied to all of the brake-shoes in spite of any wear of the brake-shoes, such as will vary the equality of thickness of the shoes.

The mechanism so far as described, as will be readily understood, is especially adapted for inside hung brake shoes which are pivotally suspended from the car truck body in the usual manner, and but few additional devices are required to adapt the same mechanism to outside hung brakes, as will now be described, reference being had more particularly to Figs. 4, 5 and 6 of the drawings. From an inspection of these views it will be seen that all of the mechanism described in Figs. 1 to 3 from the floating lever D to the fixed and floating levers Q and T, are here duplicated excepting that the positions of the last mentioned levers Q and T are reversed, the floating lever Q being now at the outer side of the truck frame while the fixed lever T is at the inner side thereof, and the said pair of levers normally converges toward the center of the truck instead of toward the outer end thereof as in Fig. 1. Instead of having the brake shoes mounted upon the outer ends of these levers, their ends are respectively connected by rods 1, 2 with the brake shoe levers 3, 4 which have the brake shoes pivotally attached to the center thereof and which at their outer ends are pivotally connected with links 5, 6 which constitute the fulcrums thereof and which are in turn pivotally connected with the ends of the stay bars 7 of the truck frame. The brake shoes are pivotally supported from the car body by the link hangers 8 more clearly shown in Figs. 5 and 6 and are also provided with the usual safety chains 9. The brake power applied to the mechanism just described, will be centrally transmitted to the brake mechanism on each car as in the construction as described and illustrated in Fig. 1 and will also be equally distributed not only to each set of brake mechanism on the different trucks of the car, but also to each brakeshoe and consequently to each wheel of the trucks, the links 5, 6 serving to permit the vertical movements of the car due to its varying loads as well as to inequalities of the track, without injury to the truck or brake mechanism, keeping the brakes at all times in their proper place.

The principal advantages of a brake mechanism of the character herein described are the central arrangement of the same so as to apply the brake power equally to each truck of the car and to each wheel of the truck; the arrangement of the horizontal levers Q and T and the vertical levers P transmitting power thereto providing a practical, durable and efficient connection between the brake shoe lever and the mechanism applying power thereto; the hook and eye or equivalent universal joint connection between levers P and Q, (which may, if desired, be reversed as to the members,) affording a safe and strong connection between the parts which will transmit the power from one lever to the other without undue loss from friction or binding; and the fulcrum links 5, 6 pivotally connected to the stay bars at the outside of the wheels and affording means of applying the brake power to outside hung brake shoes as before described.

Having thus described my invention, what I claim as new therein, and desire to secure by Letters Patent, is—

1. A car-brake, comprising levers connected together in pairs and carrying the brake-shoes, operating-levers each pivoted to a fixed support and each also connected to one of the brakeshoe-carrying levers, and operating-rods connected to said operating-levers and serving to apply power to the brake-shoes, substantially as set forth.

2. A car-brake, comprising levers connected together in pairs and carrying the brake-shoes, operating-levers each universally jointed to one of the brakeshoe-carrying levers and also pivoted upon a fixed fulcrum-support, and operating-rods connected to said operating-levers and serving to apply power to the brake-shoes, substantially as set forth.

3. A car-brake, comprising levers connected together in pairs and carrying the brake-shoes, operating-levers each pivoted to a fixed support and each connected to one of the brakeshoe-carrying levers, a central floating lever connected with power-producing devices, and operating-rods connected with the floating-lever and also with the operating-levers and serving to apply the power of the floating-lever to the brake-shoes, substantially as set forth.

4. A car-brake, comprising levers connected together in pairs and carrying the brake-shoes, operating-levers each pivoted to a fixed support and each connected to one of the brakeshoe-carrying levers, a central floating-lever connected with power-producing devices, a companion-lever pivoted to a fixed support and also connected to the floating-lever, and operating-rods connecting the floating-lever with the operating-lever of one set of brake-shoes and also connecting the companion-lever with the operating lever of the other set of brake-shoes, substantially as set forth.

5. A car-brake, comprising levers connected together in pairs and carrying the brake-shoes, operating-levers each pivoted to a fixed support and each connected to one of the brakeshoe-carrying levers, equalizing-levers each connected to the operating-lever of one set of brake-shoes, a central floating-lever connected with power-producing devices and also to one of the equalizing-levers, and a companion-lever pivoted to a fixed support and connected to the other equalizing-lever and also to said floating-lever, substantially as set forth.

6. In a car brake, the combination, with the fixed and floating levers having brake shoes pivotally attached to their outer ends and a rod connecting said levers, of an adjustable pivot for said fixed lever and operating rods connected with the floating lever for applying power to the brake shoes, substantially as described.

7. In a car brake, the combination with the fixed and floating levers having brake shoes pivotally attached to their outer ends and a rod adjustably connecting said levers, of an adjustable pivot for the fixed lever and the operating rod connected with the floating lever for applying power to the brakes, substantially as described.

8. In a car brake, the combination, with the fixed and floating levers having brake-shoes pivotally attached to their outer ends, a rod connecting said levers between their ends, and an adjustable pivot for said fixed lever, of an upright lever having a universal joint connection at one end with the floating lever and an operating rod connected with the opposite end of said lever for applying power to the brake shoes, substantially as described.

9. In a car brake, the combination, with the fixed and floating levers having brake shoes pivotally attached to their outer ends a rod connecting said levers between their ends and an adjustable pivot for the fixed lever, of an upright lever having a hook and eye connection at one end, with the inner end of the floating lever and the operating rod connected to the other end of said lever for applying power to the brake shoes, substantially as described.

10. In a car brake, the combination with the fixed lever having an adjustable attachment to the car frame, and the brake shoe pivoted to said lever and suspended from the car truck, said shoe being applied to the inner surface of one wheel of the truck, of a floating lever, a brake shoe pivotally secured to the outer end thereof and also suspended from the car truck and adapted to bear on the inner surface of the other wheel of the truck, a rod connecting said fixed and floating levers and an operating rod connected with the inner end of the floating lever, substantially as described.

JAMES McGEE.

Witnesses:
W. R. OMOHUNDRO,
TODD MASON.